United States Patent
Schweid et al.

(10) Patent No.: US 10,382,655 B2
(45) Date of Patent: Aug. 13, 2019

(54) SYSTEM AND METHOD FOR CALIBRATING A LINEAR ARRAY USING A CALIBRATION STANDARD AND A CALIBRATION PIECE WITH DARK AND LIGHT RESPONSE MEASUREMENTS

(71) Applicant: Xerox Corporation, Norwalk, CT (US)

(72) Inventors: Stuart A. Schweid, Pittsford, NY (US); Michael B. Monahan, Webster, NY (US); Robert P. Herloski, Webster, NY (US); Martin E. Hoover, Rochester, NY (US)

(73) Assignee: Xerox Corporation, Norwalk, CT (US)

( * ) Notice: Subject to any disclaimer, the term of this patent is extended or adjusted under 35 U.S.C. 154(b) by 205 days.

(21) Appl. No.: 15/651,574

(22) Filed: Jul. 17, 2017

(65) Prior Publication Data
US 2019/0020788 A1    Jan. 17, 2019

(51) Int. Cl.
*H04N 1/60* (2006.01)
*G01J 3/52* (2006.01)
(Continued)

(52) U.S. Cl.
CPC ............ *H04N 1/6033* (2013.01); *G01J 3/524* (2013.01); *H04N 1/32523* (2013.01);
(Continued)

(58) Field of Classification Search
CPC .......... G01J 3/462; G01J 3/524; G01J 3/0297; H04N 1/32523; H04N 1/6033; H04N 1/4078
(Continued)

(56) References Cited

U.S. PATENT DOCUMENTS 7,251,064 B2 * 7/2007 Chiu .................... H04N 1/4076
358/404
8,797,589 B2    8/2014 Dalal et al.

\* cited by examiner

*Primary Examiner* — Que Tan Le
(74) *Attorney, Agent, or Firm* — Simpson & Simpson, PLLC

(57) ABSTRACT

A method of balancing responses of a plurality of sensor chips arranged generally in a linear array comprising: exposing the plurality of sensor chips to an absence of illumination; measuring a dark response of each photosensor of a plurality of photosensors; positioning a calibration piece within a field of view of the plurality of sensor chips other than a calibration sensor chip; illuminating a calibration standard and the calibration piece with a light source; measuring a light response of each photosensor of the plurality of photosensors; applying an offset to the light response of each photosensor of the plurality of photosensors by subtracting the dark response of each photosensor of the plurality of photosensors to obtain an offset light response for each photosensor of the plurality of photosensors; calculating a mean offset light response for each sensor chip of the plurality of sensor chips by averaging the offset light response for each photosensor of the plurality of photosensors in each sensor chip of the plurality of sensor chips; calculating a modified light response for each photosensor of the plurality of photosensors by modifying the offset light response for each photosensor of the plurality of photosensors based on the mean offset light response of the sensor chip comprising the respective photosensor, the mean offset light response of the calibration sensor chip, an initial mean offset light response of the sensor chip comprising the respective photosensor, and an initial mean offset light response of the calibration sensor chip; and, applying a first gain to the offset light response of each photosensor of the plurality of photosensors based on the modified light
(Continued)

response of each respective photosensor to obtain a corrected light response of each photosensor of the plurality of photosensors.

20 Claims, 9 Drawing Sheets

(51) Int. Cl.
*H04N 1/32* (2006.01)
*H04N 1/407* (2006.01)
*H04N 1/48* (2006.01)
*G01J 3/46* (2006.01)
*H04N 17/02* (2006.01)

(52) U.S. Cl.
CPC .......... *H04N 1/4076* (2013.01); *H04N 1/486* (2013.01); *H04N 1/6058* (2013.01); *G01J 3/462* (2013.01); *G01J 3/465* (2013.01); *H04N 17/02* (2013.01)

(58) Field of Classification Search
USPC ........................................... 250/235
See application file for complete search history.

SYSTEM AND METHOD FOR CALIBRATING A LINEAR ARRAY USING A CALIBRATION STANDARD AND A CALIBRATION PIECE WITH DARK AND LIGHT RESPONSE MEASUREMENTS

TECHNICAL FIELD

The presently disclosed embodiments are directed to a method and system for calibrating a linear array, more specifically, a method and system for hybrid calibration of a linear array utilizing a calibration standard and a piece of media.

BACKGROUND

Image sensor arrays typically comprise a linear array of photosensors which raster scan an image bearing surface or document and convert the microscopic image areas viewed by each photosensor to image signal charges. High-performance image sensor arrays, e.g., a "full-width array," include an array of photosensors of a width comparable to the length of a page being scanned, to permit one-to-one imaging generally without the need of reductive optics.

At the time of manufacture, the variation between a plurality of photosensor chips within a given printer/scanner device that make up a linear array or a full-width array (FWA) results in the need for initial calibration of each photosensor chip in the array. Additionally, the variation between each photosensor within a given photo sensor chip may also necessitate an initial calibration. Over time the photosensors and/or photosensor chips in the array may fall out of calibration. This may happen for a number of reasons, i.e., variations in operating temperature, natural degradation of the photosensors over time, and/or natural degradation of the light source over time. Thus, a system and method for calibrating a linear array that can both be utilized during an initial calibration at the time of manufacture, as well as throughout the useful life of the printer/scanner device to account for natural degradation of the photosensors, natural degradation of the light source, and variations in operating temperature would be beneficial. Such a system and method are set forth below.

SUMMARY

Broadly, the methods discussed infra provide a method for hybrid scanner calibration. A portion of the calibration is performed using a calibration strip as a reference while the majority of calibration is performed using paper or other printable media as a calibration reference. The feedback from the portion using the calibration strip is used to modify the data received by the portion of the linear array that uses paper as a reference so that the calibration is absolute and not just relative. This permits the linear array to function as a spectrophotometer in systems where a full-length calibration strip is not feasible.

According to aspects illustrated herein, there is provided a method of balancing responses of a plurality of sensor chips arranged generally in a linear array. Each sensor chip of the plurality of sensor chips includes a plurality of photosensors. At least one sensor chip of the plurality of sensor chips is a calibration sensor chip, and a calibration standard is positioned within a field of view of the calibration sensor chip. The method includes the steps of: exposing a plurality of sensor chips to an absence of illumination; measuring a dark response of each photosensor of the plurality of photosensors; positioning a calibration piece within a field of view of the plurality of sensor chips other than the calibration sensor chip; illuminating the calibration standard and the calibration piece with a light source; measuring a light response of each photosensor of the plurality of photosensors; applying an offset to the light response of each photosensor of the plurality of photosensors by subtracting the dark response of each photosensor of the plurality of photosensors to obtain an offset light response for each photosensor of the plurality of photosensors; calculating a mean offset light response for each sensor chip of the plurality of sensor chips by averaging the offset light response for each photosensor of the plurality of photosensors in each sensor chip of the plurality of sensor chips; calculating a modified light response for each photosensor of the plurality of photosensors by modifying the offset light response for each photosensor of the plurality of photosensors based on the mean offset light response of the sensor chip including the respective photosensor, the mean offset light response of the calibration sensor chip, an initial mean offset light response of the sensor chip including the respective photosensor, and an initial mean offset light response of the calibration sensor chip; and, applying a first gain to the offset light response of each photosensor of the plurality of photosensors based on the modified light response of each respective photosensor to obtain a corrected light response of each photosensor of the plurality of photosensors.

According to other aspects illustrated herein, there is provided a scanning system including a linear array of a plurality of sensor chips, a calibration standard positioned within a field of view of the calibration sensor chip, a processor arranged to execute a set of steps, and a memory element arranged to store the set of steps. Each sensor chip of the plurality of sensor chips includes a plurality of photosensors. At least one sensor chip of the plurality of sensor chips is a calibration sensor chip. The steps stored in the memory element include: exposing the plurality of sensor chips to an absence of illumination; measuring a dark response of each photosensor of the plurality of photosensors; positioning a calibration piece within a field of view of the plurality of sensor chips other than the calibration sensor chip; illuminating the calibration standard and the calibration piece with a light source; measuring a light response of each photosensor of the plurality of photosensors; applying an offset to the light response of each photosensor of the plurality of photosensors by subtracting the dark response of each photosensor of the plurality of photosensors to obtain an offset light response for each photosensor of the plurality of photosensors; calculating a mean offset light response for each sensor chip of the plurality of sensor chips by averaging the offset light response for each photosensor of the plurality of photosensors in each sensor chip of the plurality of sensor chips; calculating a modified light response for each photosensor of the plurality of photosensors by modifying the offset light response for each photosensor of the plurality of photosensors based on the mean offset light response of the sensor chip including the respective photosensor, the mean offset light response of the calibration sensor chip, an initial mean offset light response of the sensor chip including the respective photosensor, and an initial mean offset light response of the calibration sensor chip; and, applying a first gain to the offset light response of each photosensor of the plurality of photosensors based on the modified light response of each respective photosensor to obtain a corrected light response of each photosensor of the plurality of photosensors.

According to still other aspects illustrated herein, there is provided a method of balancing responses of a plurality of sensor chips arranged generally in a linear array. Each sensor chip of the plurality of sensor chips includes a plurality of photosensors. At least two sensor chips are calibration sensor chips and a calibration standard is positioned within a field of view of the calibration sensor chips. The method includes the steps of: exposing the plurality of sensor chips to an absence of illumination; measuring a dark response of each photosensor of the plurality of photosensors; positioning a calibration piece within a field of view of the plurality of sensor chips other than the calibration sensor chips; illuminating the calibration standard and the calibration piece with a light source; measuring a light response of each photosensor of the plurality of photosensors; applying an offset to the light response of each photosensor of the plurality of photosensors by subtracting the dark response of each photosensor of the plurality of photosensors to obtain an offset light response for each photosensor of the plurality of photosensors; calculating a mean offset light response for each sensor chip of the plurality of sensor chips by averaging the offset light response for each photosensor of the plurality of photosensors in each sensor chip of the plurality of sensor chips; calculating a first gain according to the following equation:

$$g1 = \frac{[\overline{R\_calibration\_sensors}_R - (\overline{R\_calibration\_sensor}_0 - \overline{R\_non\_calibration\_sensors}_0)]}{\overline{R\_non\_calibration\_sensors}_R};$$

multiplying the first gain by the offset light response for each photosensor of the plurality of photosensors for each sensor chip of the plurality of sensor chips to obtain the modified light response of each photosensor of the plurality of photosensors; and, applying a second gain to the offset light response of each photosensor of the plurality of photosensors based on the modified light response of each respective photosensor to obtain a corrected light response of each photosensor of the plurality of photosensors. g1 is the first gain, $\overline{R\_calibration\_sensors}_R$ is an average of the mean offset light responses of each of the calibration sensor chips, $\overline{R\_calibration\_sensors}_0$ is an average of the initial mean offset light responses of each of the calibration sensor chips, $\overline{R\_non\_calibration\_sensors}_R$ is an average of the mean offset light response of each of the plurality of sensor chips other than the calibration sensor ship, and $\overline{R\_non\_calibration\_sensors}_0$ is an average of the initial mean offset light response of each of the plurality of sensor chips other than the calibration sensor ship.

Other objects, features and advantages of one or more embodiments will be readily appreciable from the following detailed description and from the accompanying drawings and claims.

BRIEF DESCRIPTION OF THE DRAWINGS

Various embodiments are disclosed, by way of example only, with reference to the accompanying drawings in which corresponding reference symbols indicate corresponding parts, in which.

DETAILED DESCRIPTION

Figure 1:
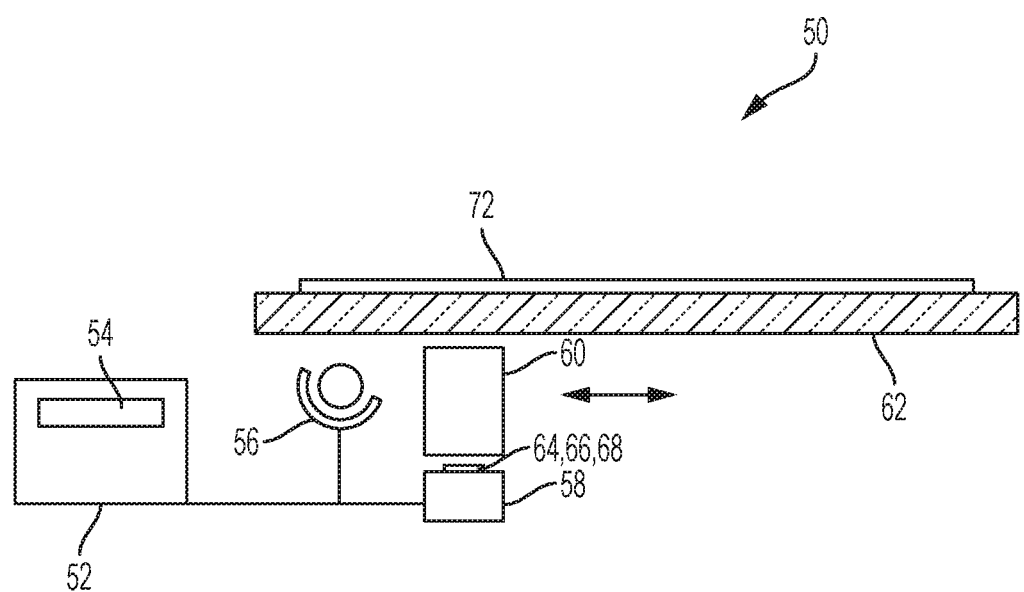
FIG. 1 is a side elevational schematic view of a scanner system having an embodiment of a full width array therein.

At the outset, it should be appreciated that like drawing numbers on different drawing views identify identical, or functionally similar, structural elements of the embodiments set forth herein. Furthermore, it is understood that these embodiments are not limited to the particular methodologies, materials and modifications described and as such may, of course, vary. It is also understood that the terminology used herein is for the purpose of describing particular aspects only, and is not intended to limit the scope of the disclosed embodiments, which are limited only by the appended claims.

Unless defined otherwise, all technical and scientific terms used herein have the same meaning as commonly understood to one of ordinary skill in the art to which these embodiments belong. As used herein, "full width array" is intended to mean an array or plurality of arrays of photosensors having a length equal or greater than the width of the substrate to be coated, for example, similar to the full width array taught in U.S. Pat. No. 5,148,268.

As used herein, "calibration standard" is intended to mean a strip of material that exhibits a known color response and is used by a photosensor as a reference point for a true color response, while "calibration piece", as used herein, is intended to mean a piece of print media, e.g., a piece of paper, that exhibits a repeatable color response relative to other pieces of media which is used by a photosensor as a reference point for a relative color response. It should be appreciated that any strip of material can serve as a "calibration standard" as long as it has greater than 8% refelectance at all wavelengths in the visible range, i.e., 400 nm-700 nm, and its spectral response does not vary as a function of location, i.e., it is the same color across the full length of the scanner.

As used herein, "white" is intended to mean a set of tristimulus values that serves to define total reflection of incident light off of the surface of a substrate in image capturing, encoding, and reproduction. White is an achromatic color without a hue. White is generally considered to be opposite to black. "Red", as used herein, is intended to mean a set of tristimulus values that serves to define a color response at a frequency range of 620 nm-740 nm of reflected incident light off of the surface of a substrate which is to be used in image capturing, encoding, and reproduction. As used herein, "green" is intended to mean a set of tristimulus values that serves to define a color response at a frequency range of 495 nm-570 nm of reflected incident light off of the surface of a substrate which is to be used in image capturing, encoding, and reproduction, while "blue", as used herein, is intended to mean a set of tristimulus values that serves to define a color response at a frequency range of 450 nm-495 nm of reflected incident light off of the surface of a substrate which is to be used in image capturing, encoding, and reproduction.

Moreover, as used herein, "dark response" is intended to mean an electrical response recorded at a given photosensor while all ambient light is removed, i.e., absence of illumination.

Furthermore, as used herein, "photosensor", "photosensor chip" or "imaging chip" is intended to be broadly construed as any collection of photosensitive pixels, e.g., a linear array of photodiodes. Additionally, the phrase "each photosensor of the plurality of photosensors" is intended to include all photosensors in an overall array discussed infra. Moreover, the words "printer," "printer system", "printing system", "printer device" and "printing device" as used herein encompasses any apparatus, such as a digital copier, bookmaking machine, facsimile machine, multi-function machine, etc. which performs a print outputting function for any purpose, while "multi-function device" and "MFD" as used herein is intended to mean a device which includes a plurality of different imaging devices, including but not limited to, a printer, a copier, a fax machine and/or a scanner, and may further provide a connection to a local area network, a wide area network, an Ethernet based network or the internet, either via a wired connection or a wireless connection. An MFD can further refer to any hardware that combines several functions in one unit. For example, MFDs may include but are not limited to a standalone printer, one or more personal computers, a standalone scanner, a mobile phone, an MP3 player, audio electronics, video electronics, GPS systems, televisions, recording and/or reproducing media or any other type of consumer or non-consumer analog and/or digital electronics. Additionally, as used herein, "sheet," "sheet of paper", "paper", "media", and "piece of media" refer to, for example, paper, transparencies, parchment, film, fabric, plastic, photo-finishing papers or other coated or non-coated substrate media in the form of a web upon which information or markings can be visualized and/or reproduced.

As used herein, the term "average" or "averaging" shall be construed broadly to include any calculation in which a result datum or decision is obtained based on a plurality of input data, which can include but is not limited to, weighted averages, yes or no decisions based on rolling inputs, etc.

Furthermore, as used herein, "and/or" is intended to mean a grammatical conjunction used to indicate that one or more of the elements or conditions recited may be included or occur. For example, a device comprising a first element, a second element and/or a third element, is intended to be construed as any one of the following structural arrangements: a device comprising a first element; a device comprising a second element; a device comprising a third element; a device comprising a first element and a second element; a device comprising a first element and a third element; a device comprising a first element, a second element and a third element; or, a device comprising a second element and a third element.

Moreover, although any methods, devices or materials similar or equivalent to those described herein can be used in the practice or testing of these embodiments, some embodiments of methods, devices, and materials are now described.

FIG. 1 depicts a side elevational schematic diagram of scanner system 50. Scanner system 50 includes processor 52, memory element 54, light source 56, circuit board 58, optical element 60, and transparent platen 62. Light source 56 can be any light source known in the art, e.g., white light-emitting diodes, incandescent light bulbs, halogen light bulbs, etc. Circuit board 58 includes a plurality of photosensors 64, which make up linear array 66. Linear array 66 is illustrated as a full width array, which includes a plurality of photosensor chips 68 arranged in a straight line that span the entire width of the document to being scanned or imaged. Optical element 60 is used to focus light reflected from the surface of the imaging media 70, calibration piece 72 (discussed infra), calibration standard 74 (discussed infra), and/or, calibration standard 76 (discussed infra) prior to transmission to the plurality of photosensors 64 of linear array 66. It should be appreciated that during operation of scanner system 50, light source 56: emits light, which reflects off calibration standard 74 and projects to the calibration sensor chip; and, emits light, which reflects off calibration piece 72 and projects to the plurality of sensor chips 68 other than the calibration sensor chips. Transparent platen 62 refers to a glass platen or flat transparent platform onto which an operator can place imaging media 70 to be scanned. It should be appreciated that although the foregoing embodiment included a transparent platen and specific arrangement of elements, i.e., configured as a conventional scanner/copier, other configurations are also possible. For example, the present system and method may be used with roll fed media, or alternatively used at the stage of print production as opposed to image capture.

Figure 2:
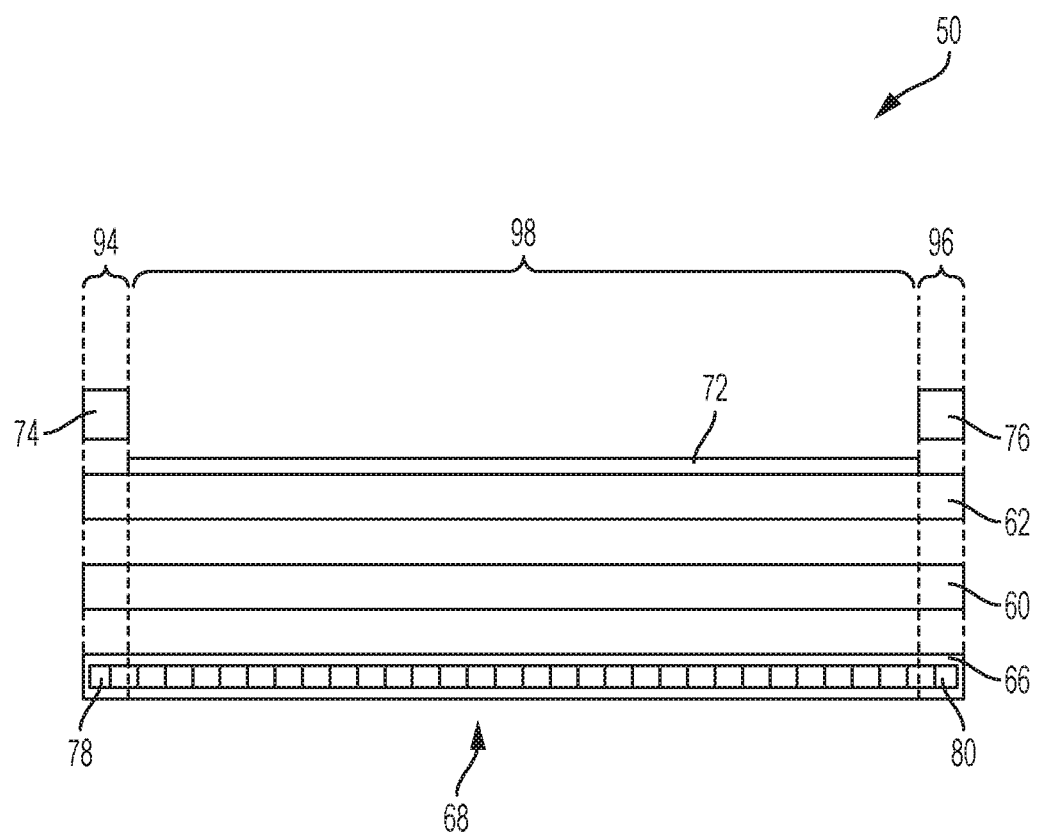
FIG. 2 is a front elevational schematic view of a scanner system having an embodiment of a full width array therein.

FIG. 2 is a front elevational schematic view of scanner system 50. In some embodiments, scanner system 50 further comprises calibration standard 74, calibration standard 76, and calibration piece 72. Calibration standards 74 and 76 are illustrated as strips of known color, e.g., white, red, green, blue, etc., and are fixedly secured above calibration sensor chips 78 and 80, respectively. Calibration piece 72 is illustrated as a piece of white paper and is positioned above all sensor chips in the plurality of sensor chips 68 except calibration sensor chips 78 and 80. It should be appreciated that calibration piece 72 is not limited to a white piece of paper, e.g., calibration piece 72 may be grey, cream, or any other color.

Figure 3:
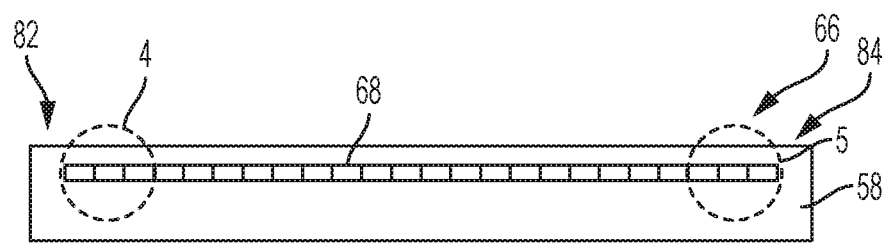
FIG. 3 is a top plan schematic representation of a full width array having a plurality of photosensor chips.

FIG. 3 is a top plan schematic view of linear array 66 used in an embodiment of the scanner system 50. Linear array 66 includes a plurality of photosensor chips 68 arranged in a straight line that span at least the entire width of a piece of imaging media being scanned or imaged. Plurality of photosensor chips 68 are fixedly secured to circuit board 58. Linear array 66 comprises a first end 82 and a second end 84.

Figure 4:
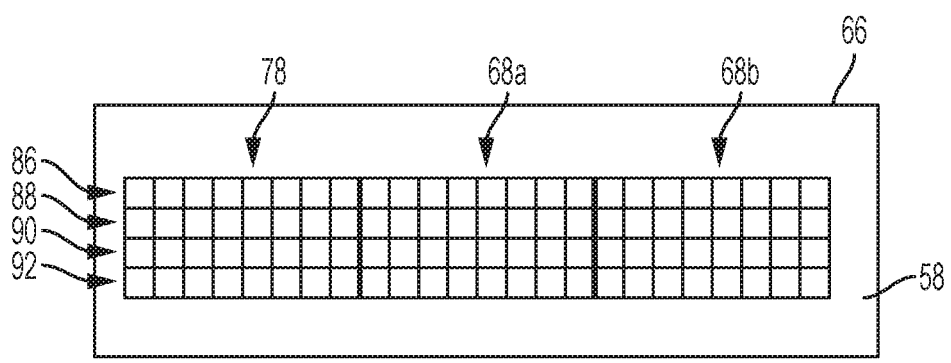
FIG. 4 is a top plan enlarged view of encircled region 4 in FIG. 3 illustrating a calibration sensor chip and two sensor chips.

FIG. 4 is top plan enlarged view of encircled region 4 of linear array 66 (as illustrated in FIG. 3). In this embodiment, each sensor chip in plurality of sensor chips 68 includes monochrome array 86, red array 88, green array 90, and blue array 92. Each of these arrays includes a row of photosensors that span the entire width of each photosensor chip. Each array is provided with a translucent filter (not shown) that causes the array to be sensitive to a particular color band or wavelength, e.g., red, green, and/or blue. Monochrome array 86 is sensitive to light throughout the visible spectrum, and is useful when scanning images for monochrome-only image data, as would be useful, for example, in a monochrome copier, facsimile machine, or for optical character scanning. FIG. 4 also illustrates calibration sensor chip 78, sensor chip 68a, and sensor chip 68b. Calibration sensor chip 78 is arranged to collect light reflected off calibration standard 74 (illustrated in FIG. 2). Sensor chips 68a and 68b are arranged to collect light reflected off calibration piece 72 (illustrated in FIG. 2).

Figure 5:
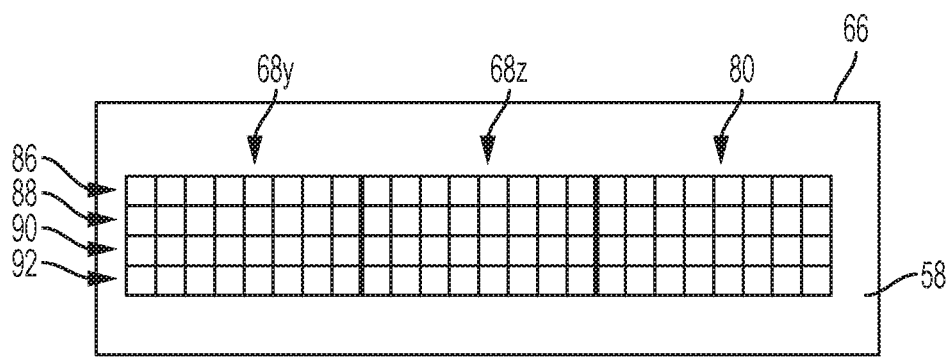
FIG. 5 is a top plan enlarged view of encircled region 5 in FIG. 3 illustrating a calibration sensor chip and two sensor chips.

FIG. 5 is top plan enlarged view of encircled region 5 of linear array 66 (as illustrated in FIG. 3). In addition to depicting similar features as depicted in FIG. 4, FIG. 5 illustrates calibration sensor chip 80, and sensor chips 68y and 68z. It should be appreciated that encircled region 5 of linear array 66 comprises sensor chips that are arranged in a reverse order from left to right than the sensor chips in encircled region 4 of linear array 66. This arrangement ensures that the calibration sensor chips 78 and 80 are the outermost sensor chips such that calibration piece 72 can be placed therebetween and adjacent linear array 66.

Figure 6:
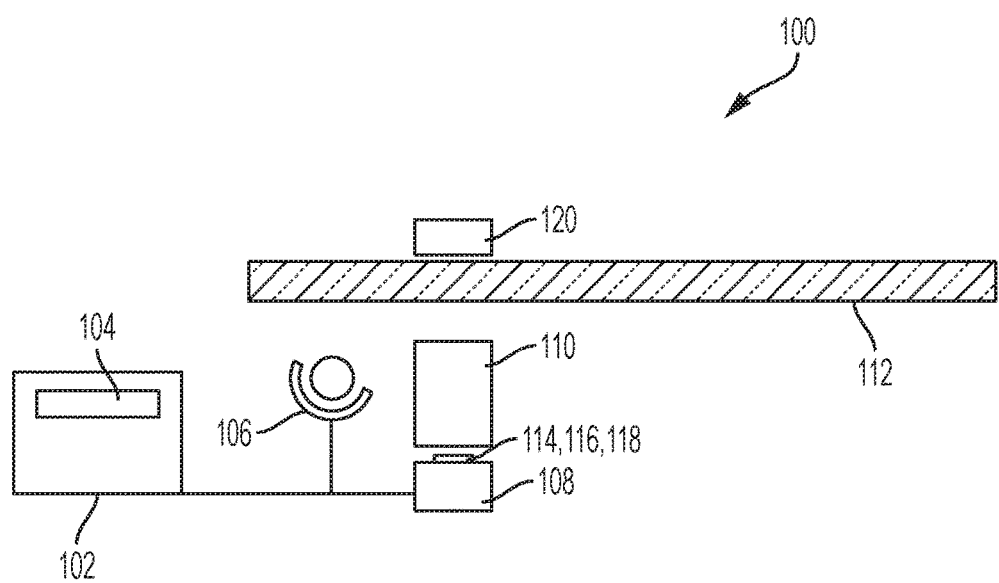
FIG. 6 is a side elevational schematic view of a pre-characterization scanner system having an embodiment of a full width array therein.

FIG. 6 depicts a side elevational schematic diagram of pre-characterization scanner system 100. Pre-characterization scanner system 100 includes processor 102, memory element 104, initial light source 106, circuit board 108, optical element 110, and transparent platen 112. Initial light source 106 can be any light source known in the art, e.g., white light-emitting diodes, incandescent light bulbs, halogen light bulbs, etc. Circuit board 108 includes a plurality of photosensors 114, which make up linear array 116. Linear array 116 is illustrated as a full width array, which includes a plurality of photosensor chips 118 arranged in a straight line that span at least the entire width of the document to be scanned or imaged. Optical element 110 is used to focus the light reflected from the surface of initial calibration standard 120 prior to transmission to the plurality of photosensors 114 of linear array 116. Initial calibration standard 120 is made of substantially the same material as calibration standards 74 and 76; however, initial calibration standard 120 spans at least the entire length of linear array 116. It should be appreciated that during operation of pre-characterization scanner system 100, initial light source 106: emits light, which reflects off initial calibration standard 120 and projects to the plurality of sensor chips 118. It should be appreciated that although the foregoing embodiment included a transparent platen and specific arrangement of elements, i.e., configured as a conventional scanner/copier, other configurations are also possible. For example, the present system and method may be used with roll fed media, or alternatively used at the stage of print production as opposed to image capture.

Figure 7:
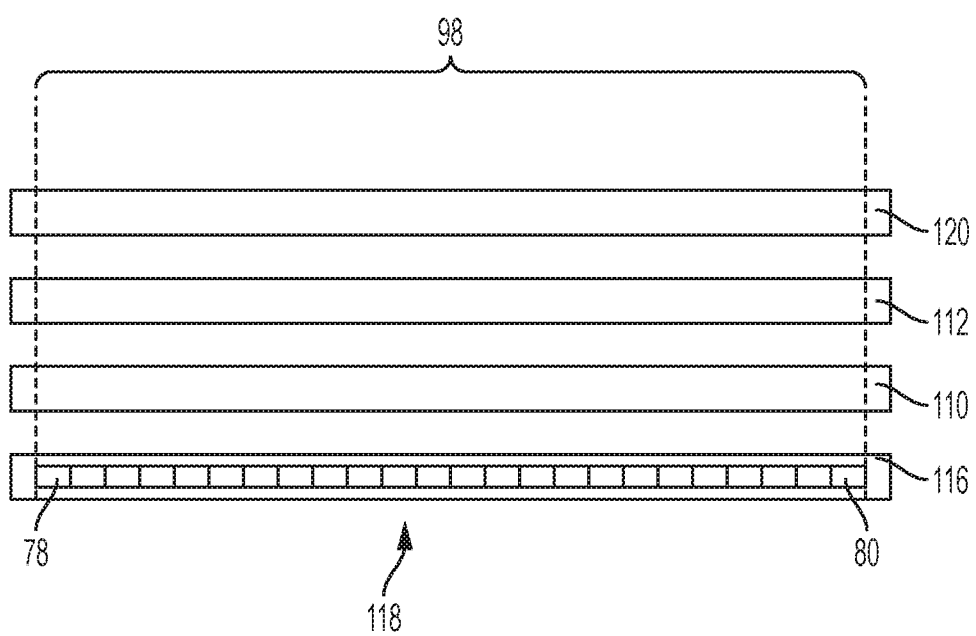
FIG. 7 is a front elevational schematic view of a pre-characterization scanner system having an embodiment of a full width array therein.

FIG. 7 is a front elevational schematic view of pre-characterization scanner system 100. In some embodiments, pre-characterization scanner system 100 further comprises initial calibration standard 120. Initial calibration standard 120 is illustrated as a uniform strip of known color, e.g., white, red, green, blue, etc., and are fixedly secured above plurality of sensor chips 118.

Figure 8:
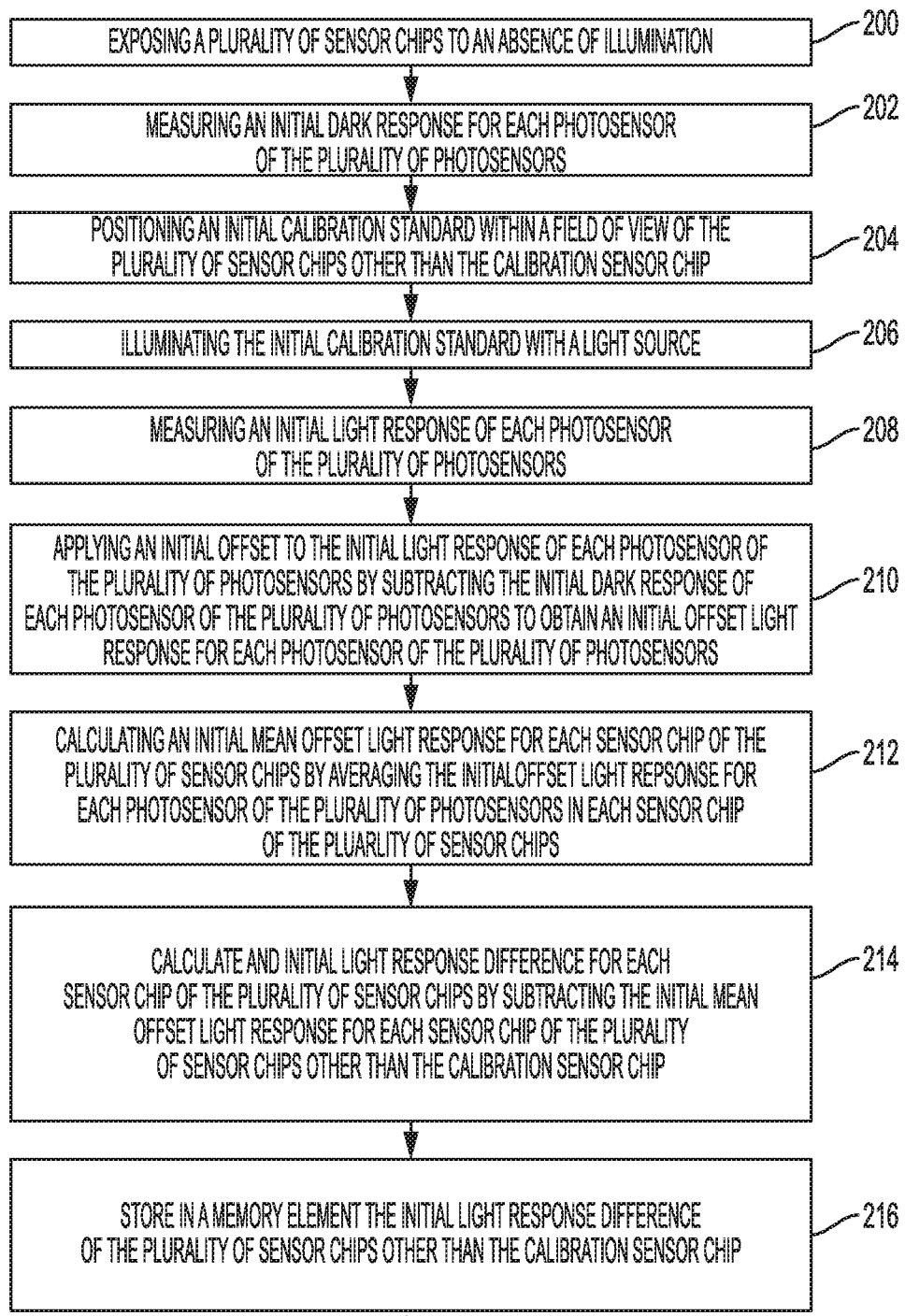
FIG. 8 is a flow chart of an embodiment of the steps of the present method.
Figure 9:
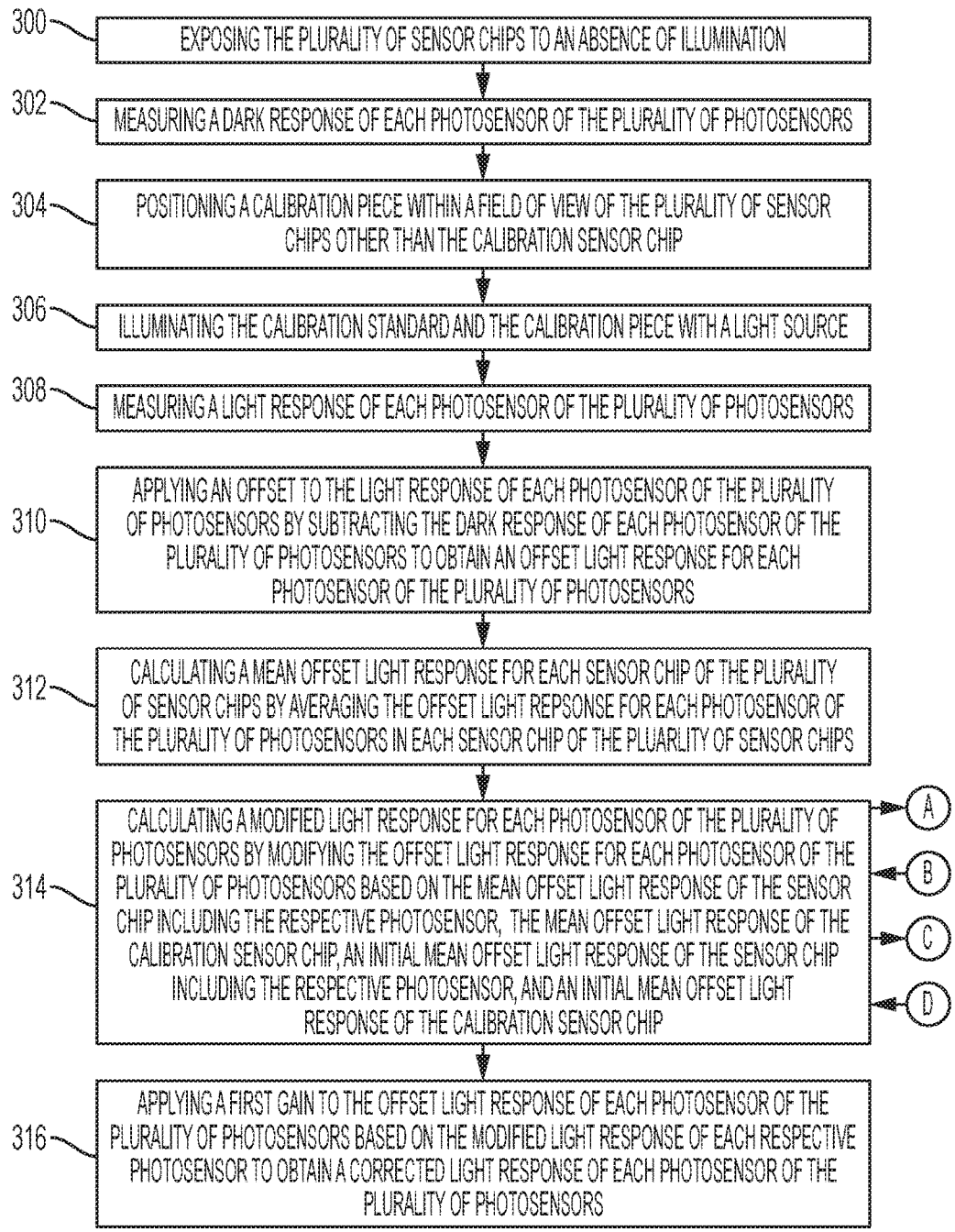
FIG. 9 is a flow chart of an embodiment of the steps of the present method; and, FIG. 10 is two additional portions of flow charts of embodiments of the steps of the present method depicted in FIG. 9.
Figure 10:
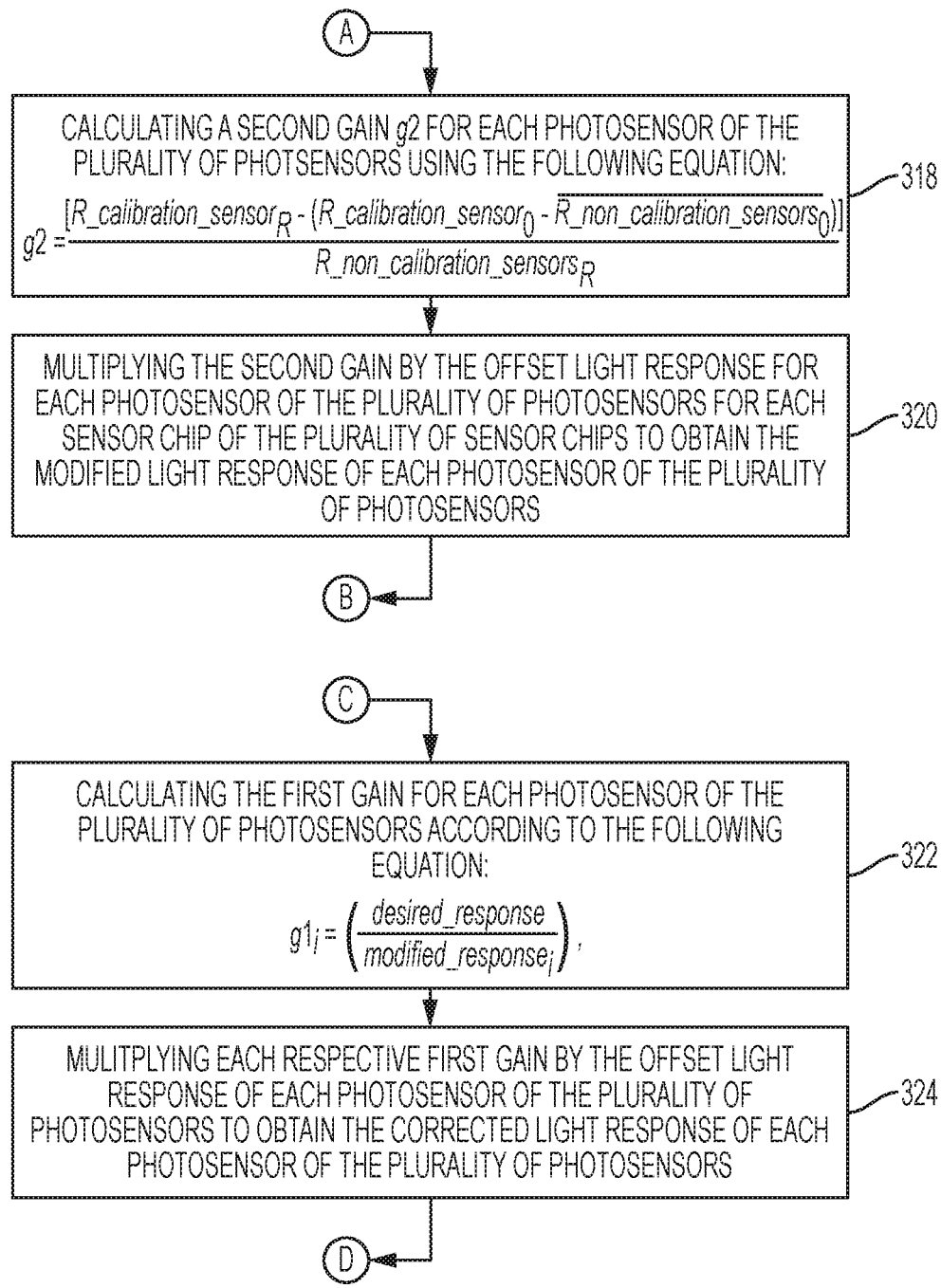

FIG. 8 illustrates a flow chart of one example embodiment of the pre-characterization method steps provided herebelow. FIG. 9 illustrates a flow chart of one example embodiment of the calibration method steps provided herebelow.

The following description sets forth examples of scanner system 50 and pre-characterization scanner system 100 each employing methods described herein. It should be appreciated that the following includes example embodiments and the disclosure is not limited to the particular methodologies described infra, or embodiments of the systems described supra.

Pre-characterization of a scanner system is an optional step in the methods described herein. Pre-characterization is usually performed by a manufacturer or distributor prior to use of scanner system 100. Pre-characterization begins by exposing each sensor chip of the plurality of sensor chips 118 to an absence of illumination (step 200). An initial dark response is measured for each photosensor i of plurality of photosensors 114 (step 202). Initial calibration standard 120 is positioned within field of view 122 of plurality of sensor chips 118 (step 204). Initial calibration standard 120 is made of substantially the same material as calibration standards 74 and 76; however, initial calibration standard 120 spans at least the entire length of linear array 116. Initial calibration standard 120 is illuminated with an initial calibration light source 106 (step 206). An initial light response is measured for each photosensor i of plurality of photosensors 114 (step 208). An initial offset is applied to the initial light response by subtracting the initial dark response of each photosensor i of plurality of photosensors 114 to obtain an initial offset light response for each photosensor i of plurality of photosensors 114 (step 210). An initial mean offset light response is calculated for each sensor chip of plurality of sensor chips 118 by averaging the initial offset light response for each photosensor i of plurality of photosensors 114 in each sensor chip of the plurality of sensor chips 118 (step 212). An initial light response difference is calculated for each sensor chip of plurality of sensor chips 118 by subtracting the initial mean offset light response for each sensor chip of plurality of sensor chips 118 other than calibration sensor chip 124 from initial mean offset light response for calibration sensor chip 124 (step 214). The initial light response difference of the plurality of sensor chips 118 other than calibration sensor chip 124 is stored in memory element 104 (step 216). It should be appreciated that pre-characterization, i.e., steps 200-216 are optional, and are not required to employ the method described herein. Moreover, it should be appreciated that pre-characterization may be performed directly with system 50 if an initial calibration standard 120 is incorporated therein.

In operation, one example embodiment provides for the balancing of responses from plurality of sensor chips 68 arranged generally in linear array 66, wherein each sensor chip of plurality of sensor chips 68 comprises plurality of photosensors 64. Calibration sensor chip 78 and/or 80 of the plurality of sensor chips is provided. Additionally, calibration standard 74 and/or 76 is positioned within field of view 94 and/or 96 of calibration sensor chip 78 and/or 80, respectively. Initially, plurality of sensor chips 68 is exposed to an absence of illumination, i.e., while all ambient light is removed and/or blocked (step 300). A dark response is measured for each photosensor i of plurality of photosensors 64 and stored in memory element 54 (step 302). The dark response is measured, then saved as a profile to be used in calculation of the offset values in subsequent measurements. Calibration piece 72 is positioned within field of view 98 of plurality of sensor chips 68 other than calibration sensor chips 78 and/or 80 (step 304). Light source 56 illuminates calibration piece 72 and calibration standards 74 and/or 76 (step 306). A light response is measured for each photosensor i of plurality of photosensors 64 (step 308). An initial offset is applied to light response of each photosensor of plurality of photosensors 64 by subtracting the dark response of each photosensor of plurality of photosensors 64 to obtain an offset light response for each photosensor of plurality of photosensors 64 (step 310). A mean offset light response for each sensor chip of the plurality of sensor chips 68 is calculated by averaging the offset light response for each photosensor i of the plurality of photosensors 64 in each sensor chip of the plurality of sensor chips 68 (step 312). It should be appreciated that an offset light response for each photosensor of the plurality of photosensors 64 can be applied before or after calculation of the mean offset light response. A modified light response is calculated for each photosensor i of the plurality of photosensors 64 by modifying the offset light response for each photosensor i of the plurality of photosensors 64 based on the mean offset light response of the sensor chip comprising the respective photosensor i, the mean offset light response of calibration sensor chip 78 and/or 80, an initial mean offset light response of the sensor chip comprising the respective photosensor i, and an initial mean offset light response of calibration sensor chip 78 and 80 (step 314). Finally, a first gain to the offset light response of each photosensor i of the plurality of photosensors 64 is applied based on the modified light response of each respective photosensor to obtain a corrected light response of each photosensor i of the plurality of photosensors 64 (step 316).

In some embodiments, the modified light response includes calculating a second gain g2 for each photosensor of the plurality of photosensors using the following equation (step 318):

$$g2 = \frac{[\text{R\_calibration\_sensors}_R - (\overline{\text{R\_calibration\_sensor}_0} - \overline{\text{R\_non\_calibration\_sensors}_0})]}{\overline{\text{R\_non\_calibration\_sensors}_R}}$$

In the above equation, g2 is the second gain; R_calibration_sensor$_R$ is the mean offset light response of calibration sensor chip 78 and/or 80; R_calibration_sensor$_0$ is the initial mean offset light response of calibration sensor chip 124; $\overline{\text{R\_non\_calibration\_sensors}_R}$ is an average of the mean offset light responses of each of the plurality of sensor chips 68 other than calibration sensor ship 78 and/or 80; and, $\overline{\text{R\_non\_calibration\_sensors}_0}$ is an average of the initial mean offset light responses of each of the plurality of sensor chips 118 other than calibration sensor chip 124. g2 is multiplied by the offset light response for each photosensor i of plurality of photosensors 64 for each sensor chip of plurality of sensor chips 68 to obtain the modified light response for each photosensor i of plurality of photosensors 64 (step 320).

In some embodiments, the following equation is used to apply first gain g1$_i$ to the offset light response of each photosensor i in the plurality of photosensors 64 (step 322):

$$g1_i = \left(\frac{\text{desired\_response}}{\text{modified\_response}_i}\right)$$

In the above equation, g1$_i$ is the first gain for a photosensor i of plurality of photosensors 64; desired_response is a desired light response of each photosensor of the plurality of photosensors 64; and, modified_response$_i$ is the modified light response of photosensor i. g1$_i$ is multiplied by the offset light response of each photosensor i of plurality of photosensors 64 to obtain the corrected light response of each photosensor i of plurality of photosensors 64 (step 324).

In embodiments where calibration steps 300-324 are performed without completion of pre-characterization (steps 200-216), the initial values used to calculate modified_response$_i$, i.e., R_calibration_sensor$_0$ and $\overline{\text{R\_non\_calibration\_sensors}_0}$, can be acquired by various sources known in the art, e.g., provided by a manufacturer or distributor of the photosensor chips or sensor arrays, or based on average values across a sample of pre-characterization values acquired from past pre-characterizations of various scanner systems.

In some embodiments, scanner system 50 includes linear array 66, processor 52, memory element 54, and calibration standard 74. It should be appreciated that scanner system 50 could include two or more calibration standards, i.e., calibration standard 74 and/or calibration standard 76. Processor 52 is arranged to execute a set of steps i.e., steps 300-324, or in the event that calibration is required without pre-characterization steps 200-216, processor 52 is arranged to perform steps 300-324. Memory element 54 is arranged to store electronic instructions for steps 300-324.

The following is a detailed description of underlying calculations used in the presently disclosed methods.

At every individual photosensor, the measured value at the photosensor can be calculated from an inner product of the reflected illumination and the absorption spectra of the photosensor channel. Thus, the following may be used:

$$\text{Gray value} = \int I(\lambda)A(\lambda)d\lambda \quad \text{or} \quad \text{Gray value} = \Sigma_\lambda I(\lambda)A(\lambda) = IA \text{(inner product of illumination and absorption vectors)} \quad (1)$$

where: I(λ), and I its discretized vector version, is the combined response of the illuminant and surface reflection; and, A(λ), and A its discretized vector version, is the absorption spectra response that encompasses all aspects of intensity to gray value conversion, e.g., filter response, QE, D/A, etc.

During calibration, the surface reflection comes from a uniform calibration strip, and its reflectance spectra is independent of its location. The illumination source and absorption response, however, may vary with both time and position.

It is possible using small signal analysis to write the illumination component and the absorption components of calibration using a Taylor series like decomposition:

$$I(s,t) = I_0 + \Delta i_t(t) + \Delta i_s(s) + \text{H.O.T. (higher order terms)}$$

$$A(s,t) = A_0 + \Delta a_t(t) + \Delta a_s(s) + \text{H.O.T. (higher order terms)} \quad (2)$$

The foregoing analysis assumes that the illumination and absorption functions can be represented as the sum of two separable functions, i.e., one function of time and one function of position. For example, $\Delta i_t(t)$ is the change in the mean illumination spectrum averaged over the length of the full width array scan bar. This allows the bar illuminator to change color as well as intensity. Similarly, $\Delta a_t(t)$ allows the mean absorption spectra to change with time, e.g., due to temperature changes. The variable $\Delta i_s(s)$ allows the spectra or intensity to change as a function of bar position. Similarly, $\Delta a_s(s)$ allows variation in spectra from chip to chip due to changes in filter absorption characteristics or quantum efficiency of the CCD sensor.

The decomposition of Equation (2) does not, however, allow for the local hot spot location of the illuminator to change over time, or the spectra of the illuminator to change only at certain locations. Furthermore, the absorption spectra cannot change differently over time from one location to another due to due to spatially varying temperature increases.

When the conditions of separability provide a good approximation, Equations (1) and (2) can be combined to form:

$$\text{Gray value} \approx I_0 A_0 + (I_0 \Delta a_s(s) + A_0 \Delta i_s(s) + \Delta i_s(s) \Delta a_s(s)) + (A_0 \Delta i_t(t) + I_0 \Delta a_t(t) + \Delta i_t(t) \Delta a_t(t)) + (\Delta i_t(t) \Delta a_s(s) + \Delta i_s(s) \Delta a_s(s)) \quad (3)$$

It should be noted that the first portion of the Equation (3) has components that do not change over time, only over position, i.e., they will be the same for all calibrations. The second portion of Equation (3), however, is time dependent, and therefore, it adds the same amount to measured sensor gray value. The last term of Equation (3) [($\Delta i_r(t)\Delta a_s$ (s)+ $\Delta i_s(s)\Delta a_s(s)$)], however, is both time and position dependent, and it adds different amounts to the sensor output dependent on position.

If the gray values resulting from Equation (3) are under a calibration strip, and are averaged over several values, then the result will be the sum of all the terms of Equation (3) with the exception of the last term, plus the average of the last term. If the temporal variation of illumination is orthogonal to the spatial variation of absorption, and the temporal variation of absorption is orthogonal to the spatial variation of illumination, then the terms in the third portion of Equation (3) will have a vanishing effect on the mean gray value of the response. This usually requires that at least one of the delta variables in each of the two terms of the third portion of Equation (3) has a small mean value compared to the global mean of that variable. In this instance, the average gray value can be approximated by:

$$\overline{\text{Grayvalue}} \approx I_0 A_0 + (E\{I_0\Delta a_s(s)\} + E\{A_0\Delta i_s(s)\} + E\{\Delta i_s(s)\Delta a_s(s)\}) + (A_0\Delta i_r(t) + I_0\Delta a_r(t) + \Delta i_r(t)\Delta a_r(t)) \quad (4)$$

One result of Equation (4) is that the mean difference gray level difference under calibration between any two sets of sensor chips of a full width array does not change over time. This is because the first portion of Equation (4) is unique for a chip, since it contains spatial components, but does not change over time, and the second portion is identical for all chips at any given time. The mean difference in gray response between any pair of full width array sensor chips, i and j, results in the following constant difference:

$$\overline{\text{Grayvalue}_i} - \overline{\text{Grayvalue}_j} = K(i,j) = -K(j,i) \quad (5)$$

where: K(i,j) is the difference between the mean response of two full width array sensor chips.

It should be appreciated that K(i,j) is a constant that is different for each pair of full width array sensor chips. The values of all of the differences between full width array sensor chips, i.e., K(i,j), can therefore be measured at the time of manufacture when all full width array sensor chips are under a uniform calibration strip.

Equation (5) can be used during run time calibration when one or more of the sensor chips of the full width array is measuring a calibration strip but the other sensor chips of the full width array are measuring paper. The calibration strip and paper are both considered to be spatially uniform. It should be appreciated that although paper does have variation, this variation is reduced by averaging the response of the full width array over a large area of the paper. Averaging of this type reduces paper noise as long as the paper has no structured cross process variation. The resultant mean gray value measured for the full width array sensor chips under the paper is:

$$\overline{\text{Grayvalue}} \approx pI_0 A_0 + (E\{pI_0\Delta a_s(s)\} + E\{A_0P\Delta i_s(s)\} + E\{P\Delta i_s(s)\Delta a_s(s)\}) + (A_0p\Delta i_r(t) + pI_0\Delta a_r(t) + p\Delta i_r(t)\Delta a_r(t)) \quad (6)$$

where: p is the relative reflectivity of the paper as compared with the calibration strip, i.e., paper reflectance/calibration strip reflectance; and, pX, e.g., $pI_0$, is not vector multiplication but element by element multiplication, e.g., $pX(i)=p(i)*X(i)$.

If the paper is white and does not have significantly different fluorescing properties than the calibration strip, its reflectivity can be considered to be constant over the spectral domain where both the absorption and illumination are significant. In this instance, Equation (6) reduces to:

$$\overline{\text{Grayvalue}} \approx p*(I_0 A_0 + (E\{I_0\Delta a_s(s)\} + E\{A_0\Delta i_s(s)\} + E\{\Delta i_s(s)\Delta a_s(s)\}) + (A_0\Delta i_r(t) + I_0\Delta a_r(t) + \Delta i_r(t)\Delta a_r(t))) \quad (7)$$

where: p is a unknown scalar that is a property of the paper reflectance.

However, in the presence of the calibration strip, the difference between the measured full width array sensor chip under the paper is known using Equation (5). Therefore, the gain for the $j^{th}$ full width array sensor chip, g(j), that restores the values that would be measured under the calibration strip satisfies:

$$\overline{\text{Grayvalue}_0} - g(j)\overline{\text{Grayvalue}_j} = K(0,j), \text{ solving for } g(j), g(j) = (\overline{\text{Grayvalue}_0} - K(0,j))/\overline{\text{Grayvalue}_j} \quad (8)$$

where: $\overline{\text{Grayvalue}_0}$ is the mean gray value of the full width array sensor chip measured using the calibration strip; and, $\overline{\text{Grayvalue}_j}$ is the mean value of the $j^{th}$ full width array sensor chip measured using paper.

During an in-situ or run time calibration, all the measurements of each full width array sensor chip that uses paper during the calibration stage are multiplied by the chip specific full width array gain calculated in Equation (8). Calibration proceeds normally after all of the measured gray values are modified.

The following enumerated steps of calibrating using paper represents an embodiment of the present method:

1) Measure the FWA under a calibration strip during manufacturing
2) For each chip calculate the mean gray response
3) Determine the differences between the mean responses for each pair of FWA chips
4) During run time (in machine) calibration, measure at least one chip using a calibration strip and the rest using paper
5) Using the FWA chip under the calibration strip (chip 0) calculate a gain for each chip under the paper using:
   a. $g(j) = (\overline{\text{grayvalue}_0} - K(0,j))/\overline{\text{grayvalue}_j}$
6) For each measurement of a given FWA chip multiply it by its chip specific gain, g(j)
7) Proceed with rest of calibration normally The systems and methods illustrated above broadly describe a hybrid scanner calibration system and method utilizing calibration standard 74 and/or 76 and calibration piece 72 as a reference media. The method proposes a technique to perform an absolute calibration of a full width array (Linear array 66) in the absence of a full width calibration standard. The method works when the relative gain between chips remains the same and illumination changes are constant across the array. A one-time measurement of the interchip gain and offset variation is performed at setup (pre-characterization) by measuring each chips response to a uniform calibration standard and with no illumination. During operation, the gain of chips at the extreme ends of the array are measured with a calibration standard, i.e., calibration standards 74 and 76, and gain of the chips monitoring paper are inferred from the initial measurement. The relative gain and offset of the sensors within each chip is measured during each calibration. Performing an absolute calibration with a full width array eliminates the need for spectrophotometry, thus adding color calibration to the existing capabilities of a full width array sensor. Operations free of full width calibration standards eliminate the additional mechanisms needed to rotate the sensor away from the paper so it views the calibration standard. The disclosed methods allow only partial areas of a full width array to be under a calibration strip, enabling full width array usage in web based system designs without the need for complex hardware to enable calibration.

It will be appreciated that various of the above-disclosed and other features and functions, or alternatives thereof, may be desirably combined into many other different systems or applications. Various presently unforeseen or unanticipated alternatives, modifications, variations or improvements therein may be subsequently made by those skilled in the art which are also intended to be encompassed by the following claims.

What is claimed is:

1. A method of balancing responses of a plurality of sensor chips arranged generally in a linear array, wherein each sensor chip of the plurality of sensor chips comprises a plurality of photosensors, at least one sensor chip of the plurality of sensor chips is a calibration sensor chip and a calibration standard is positioned within a field of view of the calibration sensor chip, the method comprising:
    exposing the plurality of sensor chips to an absence of illumination;
    measuring a dark response of each photosensor of the plurality of photosensors;
    positioning a calibration piece within a field of view of the plurality of sensor chips other than the calibration sensor chip;
    illuminating the calibration standard and the calibration piece with a light source;
    measuring a light response of each photosensor of the plurality of photosensors;
    applying an offset to the light response of each photosensor of the plurality of photosensors by subtracting the dark response of each photosensor of the plurality of photosensors to obtain an offset light response for each photosensor of the plurality of photosensors;
    calculating a mean offset light response for each sensor chip of the plurality of sensor chips by averaging the offset light response for each photosensor of the plurality of photosensors in each sensor chip of the plurality of sensor chips;
    calculating a modified light response for each photosensor of the plurality of photosensors by modifying the offset light response for each photosensor of the plurality of photosensors based on the mean offset light response of the sensor chip comprising the respective photosensor, the mean offset light response of the calibration sensor chip, an initial mean offset light response of the sensor chip comprising the respective photosensor, and an initial mean offset light response of the calibration sensor chip; and,
    applying a first gain to the offset light response of each photosensor of the plurality of photosensors based on the modified light response of each respective photosensor to obtain a corrected light response of each photosensor of the plurality of photosensors.

2. The method of claim 1 wherein the calibration sensor chip is a single calibration sensor chip.

3. The method of claim 1 wherein the linear array comprises a first end and a second opposite the first end, and the calibration sensor chip is positioned at the first and/or second end of the linear array.

4. The method of claim 1 wherein energy emitted from the light source reflects off the calibration standard and projects to the calibration sensor chip and reflects off the calibration piece and projects to the plurality of sensor chips other than the calibration sensor chip.

5. The method of claim 1 wherein the calibration standard is substantially a white color.

6. The method of claim 1 further comprising:
    pre-characterizing the plurality of sensors comprises:
        exposing the plurality of sensor chips to an absence of illumination;
        measuring an initial dark response of each photosensor of the plurality of photosensors;
        positioning an initial calibration standard within a field of view of the plurality of sensor chips;
        illuminating the initial calibration standard with an initial calibration light source;
        measuring an initial light response of each photosensor of the plurality of photosensors;
        applying an initial offset to the initial light response of each photosensor of the plurality of photosensors by subtracting the initial dark response of each photosensor of the plurality of photosensors to obtain an initial offset light response for each photosensor of the plurality of photosensors;
        calculating the initial mean offset light response for each sensor chip of the plurality of sensor chips by averaging the initial offset light response for each photosensor of the plurality of photosensors in each sensor chip of the plurality of sensor chips;
        calculating an initial light response difference for each sensor chip of the plurality of sensor chips other than the calibration sensor chip by subtracting the initial mean offset light response for each sensor chip of the plurality of sensor chips other than the calibration sensor chip from the initial mean offset light response for the calibration sensor chip; and,
        storing the initial light response difference for each sensor chip of the plurality of sensor chips other than the calibration sensor chip in a memory element associated with the plurality of sensor chips.

7. The method of claim 6 wherein the step of calculating a modified light response for each photosensor of the plurality of photosensors comprises:
    calculating a second gain according to the following equation:

$$g2 = \frac{[\text{R\_calibration\_sensors}_R - (\text{R\_calibration\_sensor}_0 - \overline{\text{R\_non\_calibration\_sensors}_0})]}{\overline{\text{R\_non\_calibration\_sensors}_R}};$$

where: g2 is the second gain,
    R_calibration_sensor$_R$ is the mean offset light response of the calibration sensor chip,
    R_calibration_sensor$_0$ is the initial mean offset light response of the calibration sensor chip,
    $\overline{\text{R\_non\_calibration\_sensors}_R}$ is an average of the mean offset light responses of each of the plurality of sensor chips other than the calibration sensor ship, and
    $\overline{\text{R\_non\_calibration\_sensors}_0}$ is an average of the initial mean offset light responses of each of the plurality of sensor chips other than the calibration sensor ship; and,
multiplying the second gain by the offset light response for each photosensor of the plurality of photosensors for each sensor chip of the plurality of sensor chips to obtain the modified light response of each photosensor of the plurality of photosensors.

8. The method of claim 7 wherein the step of applying a first gain to the offset light response of each photosensor of the plurality of photosensors comprises:
calculating the first gain for each photosensor of the plurality of photosensors according to the following equation:

$$g1_i = \left(\frac{desired\_response}{modified\_response_i}\right),$$

where: $g1_i$ is the first gain for a photosensor i of the plurality of photosensors,
desired_response is a desired light response of each photosensor of the plurality of photosensors,
modified_response$_i$ is the modified light response of the photosensor i; and,
multiplying each respective first gain by the offset light response of each photosensor of the plurality of photosensors to obtain the corrected light response of each photosensor of the plurality of photosensors.

9. The method of claim 1 wherein the step of applying a first gain to the offset light response of each photosensor of the plurality of photosensors comprises:
calculating the first gain for each photosensor of the plurality of photosensors according to the following equation:

$$g1_i = \left(\frac{desired\_response}{modified\_response_i}\right),$$

where: $g1_i$ is the first gain for a photosensor i of the plurality of photosensors,
desired_response is a desired light response of each photosensor of the plurality of photosensors,
modified_response$_i$ is the modified light response of the photosensor i; and,
multiplying each respective first gain by the offset light response of each photosensor of the plurality of photosensors to obtain the corrected light response of each photosensor of the plurality of photosensors.

10. A scanning system comprising:
a linear array of a plurality of sensor chips, wherein each sensor chip of the plurality of sensor chips comprises a plurality of photosensors, at least one sensor chip of the plurality of sensor chips is a calibration sensor chip;
a calibration standard positioned within a field of view of the calibration sensor chip;
a processor arranged to execute a set of steps; and,
a memory element arranged to store the set of steps comprising:
exposing the plurality of sensor chips to an absence of illumination;
measuring a dark response of each photosensor of the plurality of photosensors;
positioning a calibration piece within a field of view of the plurality of sensor chips other than the calibration sensor chip;
illuminating the calibration standard and the calibration piece with a light source;
measuring a light response of each photosensor of the plurality of photosensors;
applying an offset to the light response of each photosensor of the plurality of photosensors by subtracting the dark response of each photosensor of the plurality of photosensors to obtain an offset light response for each photosensor of the plurality of photosensors;
calculating a mean offset light response for each sensor chip of the plurality of sensor chips by averaging the offset light response for each photosensor of the plurality of photosensors in each sensor chip of the plurality of sensor chips;
calculating a modified light response for each photosensor of the plurality of photosensors by modifying the offset light response for each photosensor of the plurality of photosensors based on the mean offset light response of the sensor chip comprising the respective photosensor, the mean offset light response of the calibration sensor chip, an initial mean offset light response of the sensor chip comprising the respective photosensor, and an initial mean offset light response of the calibration sensor chip; and,
applying a first gain to the offset light response of each photosensor of the plurality of photosensors based on the modified light response of each respective photosensor to obtain a corrected light response of each photosensor of the plurality of photosensors.

11. The scanning system of claim 10 wherein the calibration sensor chip is a single calibration sensor chip.

12. The scanning system of claim 10 wherein the linear array comprises a first end and a second opposite the first end, and the calibration sensor chip is positioned at the first and/or second end of the linear array.

13. The scanning system of claim 10 wherein energy emitted from the light source reflects off the calibration standard and projects to the calibration sensor chip and reflects off the calibration piece and projects to the plurality of sensor chips other than the calibration sensor chip.

14. The scanning system of claim 10 wherein the calibration standard is substantially a white color.

15. The scanning system of claim 10, wherein the set of steps further comprising:
pre-characterizing the plurality of sensors comprises:
exposing the plurality of sensor chips to an absence of illumination;
measuring an initial dark response of each photosensor of the plurality of photosensors;
positioning an initial calibration standard within a field of view of the plurality of sensor chips;
illuminating the initial calibration standard with an initial calibration light source;
measuring an initial light response of each photosensor of the plurality of photosensors;
applying an initial offset to the initial light response of each photosensor of the plurality of photosensors by subtracting the initial dark response of each photosensor of the plurality of photosensors to obtain an initial offset light response for each photosensor of the plurality of photosensors;
calculating the initial mean offset light response for each sensor chip of the plurality of sensor chips by averaging the initial offset light response for each photosensor of the plurality of photosensors in each sensor chip of the plurality of sensor chips;
calculating an initial light response difference for each sensor chip of the plurality of sensor chips other than the calibration sensor chip by subtracting the initial mean offset light response for each sensor chip of the plurality of sensor chips other than the calibration sensor chip from the initial mean offset light response for the calibration sensor chip; and, storing the initial light response difference for each sensor chip of the plurality of sensor chips other than the calibration sensor chip in a memory element associated with the plurality of sensor chips.

16. The scanning system of claim 15 wherein the step of calculating a modified light response for each photosensor of the plurality of photosensors comprises:
calculating a second gain according to the following equation:

$$g2 = \frac{[\text{R\_calibration\_sensor}_R - (\text{R\_calibration\_sensor}_0 - \overline{\text{R\_non\_calibration\_sensors}_0})]}{\overline{\text{R\_non\_calibration\_sensors}_R}};$$

where: g2 is the second gain,
R_calibration_sensor$_R$ is the mean offset light response of the calibration sensor chip,
R_calibration_sensor$_0$ is the initial mean offset light response of the calibration sensor chip,
$\overline{\text{R\_non\_calibration\_sensors}_R}$ is an average of the mean offset light responses of each of the plurality of sensor chips other than the calibration sensor ship, and
$\overline{\text{R\_non\_calibration\_sensors}_0}$ is an average of the initial mean offset light responses of each of the plurality of sensor chips other than the calibration sensor ship; and,
multiplying the second gain by the offset light response for each photosensor of the plurality of photosensors for each sensor chip of the plurality of sensor chips to obtain the modified light response of each photosensor of the plurality of photosensors.

17. The scanning system of claim 16 wherein the step of applying a first gain to the offset light response of each photosensor of the plurality of photosensors comprises:
calculating the first gain for each photosensor of the plurality of photosensors according to the following equation:

$$g1_i = \left(\frac{\text{desired\_response}}{\text{modified\_response}_i}\right),$$

where: $g1_i$ is the first gain for a photosensor i of the plurality of photosensors,
desired_response is a desired light response of each photosensor of the plurality of photosensors,
modified_response$_i$ is the modified light response of the photosensor i; and,
multiplying each respective first gain by the offset light response of each photosensor of the plurality of photosensors to obtain the corrected light response of each photosensor of the plurality of photosensors.

18. The scanning system of claim 10 wherein the step of applying a first gain to the offset light response of each photosensor of the plurality of photosensors comprises:
calculating the first gain for each photosensor of the plurality of photosensors according to the following equation:

$$g1_i = \left(\frac{\text{desired\_response}}{\text{modified\_response}_i}\right),$$

where: $g1_i$ is the first gain for a photosensor i of the plurality of photosensors,
desired_response is a desired light response of each photosensor of the plurality of photosensors,
modified_response$_i$ is the modified light response of the photosensor i; and,
multiplying each respective first gain by the offset light response of each photosensor of the plurality of photosensors to obtain the corrected light response of each photosensor of the plurality of photosensors.

19. A method of balancing responses of a plurality of sensor chips arranged generally in a linear array, wherein each sensor chip of the plurality of sensor chips comprises a plurality of photosensors, at least two sensor chips of the plurality of sensor chips are a calibration sensor chip and a calibration standard is positioned within a field of view of the calibration sensor chips, the method comprising:
exposing the plurality of sensor chips to an absence of illumination;
measuring a dark response of each photosensor of the plurality of photosensors;
positioning a calibration piece within a field of view of the plurality of sensor chips other than the calibration sensor chips;
illuminating the calibration standard and the calibration piece with a light source;
measuring a light response of each photosensor of the plurality of photosensors;
applying an offset to the light response of each photosensor of the plurality of photosensors by subtracting the dark response of each photosensor of the plurality of photosensors to obtain an offset light response for each photosensor of the plurality of photosensors;
calculating a mean offset light response for each sensor chip of the plurality of sensor chips by averaging the offset light response for each photosensor of the plurality of photosensors in each sensor chip of the plurality of sensor chips;
calculating a first gain according to the following equation:

$$g1 = \frac{[\overline{\text{R\_calibration\_sensors}_R} - (\overline{\text{R\_calibration\_sensors}_0} - \overline{\text{R\_non\_calibration\_sensors}_0})]}{\overline{\text{R\_non\_calibration\_sensors}_R}},$$

where: g1 is the first gain,
$\overline{\text{R\_calibration\_sensors}_R}$ is an average of the mean offset light responses of each of the calibration sensor chips,
$\overline{\text{R\_calibration\_sensors}_0}$ is an average of the initial mean offset light responses of each of the calibration sensor chips,
$\overline{\text{R\_non\_calibration\_sensors}_R}$ is an average of the mean offset light response of each of the plurality of sensor chips other than the calibration sensor ship, and
$\overline{\text{R\_non\_calibration\_sensors}_0}$ is an average of the initial mean offset light response of each of the plurality of sensor chips other than the calibration sensor ship; and,
multiplying the first gain by the offset light response for each photosensor of the plurality of photosensors for each sensor chip of the plurality of sensor chips to obtain the modified light response of each photosensor of the plurality of photosensors.

applying a second gain to the offset light response of each photosensor of the plurality of photosensors based on the modified light response of each respective photosensor to obtain a corrected light response of each photosensor of the plurality of photosensors.

20. The method of claim 19 wherein the step of applying a second gain to the offset light response of each photosensor of the plurality of photosensors comprises:

calculating the second gain for each photosensor of the plurality of photosensors according to the following equation:

$$g2_i = \left(\frac{desired\_response}{modified\_response_i}\right),$$

where: $g2_i$ is the first gain for a photosensor i of the plurality of photosensors,
desired_response is a desired light response of each photosensor of the plurality of photosensors,
modified_response$_i$ is the modified light response of the photosensor i; and,
multiplying each respective second gain by the offset light response of each photosensor of the plurality of photosensors to obtain the corrected light response of each photosensor of the plurality of photosensors.

\* \* \* \* \*